United States Patent
Kemmler et al.

(10) Patent No.: US 9,053,134 B2
(45) Date of Patent: *Jun. 9, 2015

(54) VIEW VARIANTS IN DATABASE SCHEMA MAPPING

(71) Applicants: Andreas Kemmler, Boennigheim (DE); Torsten Kamenz, Wiesloch (DE)

(72) Inventors: Andreas Kemmler, Boennigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 222 days.

This patent is subject to a terminal disclaimer.

(21) Appl. No.: 13/828,027

(22) Filed: Mar. 14, 2013

(65) Prior Publication Data

US 2014/0280368 A1 Sep. 18, 2014

(51) Int. Cl.
*G06F 7/00* (2006.01)
*G06F 17/30* (2006.01)

(52) U.S. Cl.
CPC .......... *G06F 17/30294* (2013.01); *G06F 17/30* (2013.01)

(58) Field of Classification Search
CPC ............... G06F 17/30392; G06F 17/30292
USPC .......................................................... 707/803
See application file for complete search history.

(56) References Cited

U.S. PATENT DOCUMENTS

| | | | | |
|---|---|---|---|---|
| 5,737,591 | A * | 4/1998 | Kaplan et al. ........................ | 1/1 |
| 8,190,646 | B2 * | 5/2012 | Laxminarayanan .......... | 707/792 |
| 8,694,559 | B2 | 4/2014 | Kemmler et al. | |
| 2004/0181543 | A1 * | 9/2004 | Wu et al. ....................... | 707/102 |
| 2005/0060647 | A1 * | 3/2005 | Doan et al. .................... | 715/514 |
| 2006/0074953 | A1 * | 4/2006 | Dettinger et al. ............. | 707/101 |
| 2008/0319968 | A1 * | 12/2008 | Dettinger et al. ................. | 707/4 |
| 2014/0019410 | A1 | 1/2014 | Kemmler et al. | |
| 2014/0181154 | A1 * | 6/2014 | Amulu et al. ................. | 707/803 |
| 2014/0258217 | A1 * | 9/2014 | Kemmler ...................... | 707/609 |

\* cited by examiner

*Primary Examiner* — Binh V Ho
(74) *Attorney, Agent, or Firm* — Brake Hughes Bellermann LLP (57) ABSTRACT

This disclosure includes a method, a system and a computer readable medium. The method includes receiving a data model configured to model data in a first database schema in a database system, using the received data model to generate a first data view of a first instance of the first database schema in the database system, including referencing, using a first view variant, one or more data tables including the first instance of the first database schema to generate the first data view, and using the received data model to generate a second data view of a second instance of the first database schema in the database system, including referencing, using a second view variant, one or more data tables including the second instance of the first database schema to generate the second data view.

20 Claims, 6 Drawing Sheets

| Content Package | View Variant | Authoring Schema | Physical Schema |
|---|---|---|---|
| Ven1.Pkg1.Comp1 | ERP_1 | V1_Sch1 | ERP1 |
| Ven1.Pkg1.Comp1 | ERP_2 | V1_Sch1 | ERP2 |
| Ven1.Pkg1.Comp2 | HCM_1 | V1_Sch1 | ERP1 |
| Ven2.Pkg1.Comp1 | ERP_3 | V2_Sch1 | ERP3 |
| Ven2.Pkg1.Comp1 | ERP_4 | V2_Sch1 | ERP4 |
| : | : | : | : |
| : | : | : | : |
| n-1 | n-1 | n-1 | n-1 |
| n | n | n | n |

| Calling Package | Calling Package View Varient | Called Package | Called Package View Varient |
|---|---|---|---|
| Ven1.Pkg1.Comp2 | HCM_1 | Ven1.Pkg1.Comp1 | ERP_1 |
| Ven1.Pkg1.Comp3 | * | Ven1.Pkg1.Comp1 | ERP_1 |
| : | : | : | : |
| : | : | : | : |
| n-1 | n-1 | n-1 | n-1 |
| n | n | n | n |

VIEW VARIANTS IN DATABASE SCHEMA MAPPING

FIELD

Embodiments relate to mapping database schema in interconnected database systems.

BACKGROUND

Consolidating the various data systems in a business enterprise (or any other organization) into a centralized data system is increasingly common. For example, the SAP HANA® database product provides advanced database technology such as an in-memory database engine that can allow the enterprise to store its most relevant data in main memory which enables analytics to be performed directly in the database.

However, an enterprise may maintain separate duplicate data systems for some of their operations. For example, a data system for facilities (e.g., manufacturing, sales, etc.) in the U.S. may be maintained separately from corresponding data system for facilities in Europe. Providing a set of data for each of the two data systems in a centralized data system may be implemented by creating multiple instances of a database schema for the separate data systems. Data modeling, however, then becomes a challenge because a data model is typically specific to a database schema. Managing multiple separate copies of a data model for each database schema can be time consuming from a development point of view and can be error prone when new versions of the data model become available and new copies need to be redeveloped.

SUMMARY

One embodiment includes a method for sharing data in an interconnected database system. The method includes receiving a data model configured to model data in a first database schema in a database system, using the received data model to generate a first data view of a first instance of the first database schema in the database system, including referencing, using a first view variant, one or more data tables including the first instance of the first database schema to generate the first data view, and using the received data model to generate a second data view of a second instance of the first database schema in the database system, including referencing, using a second view variant, one or more data tables including the second instance of the first database schema to generate the second data view.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 1:
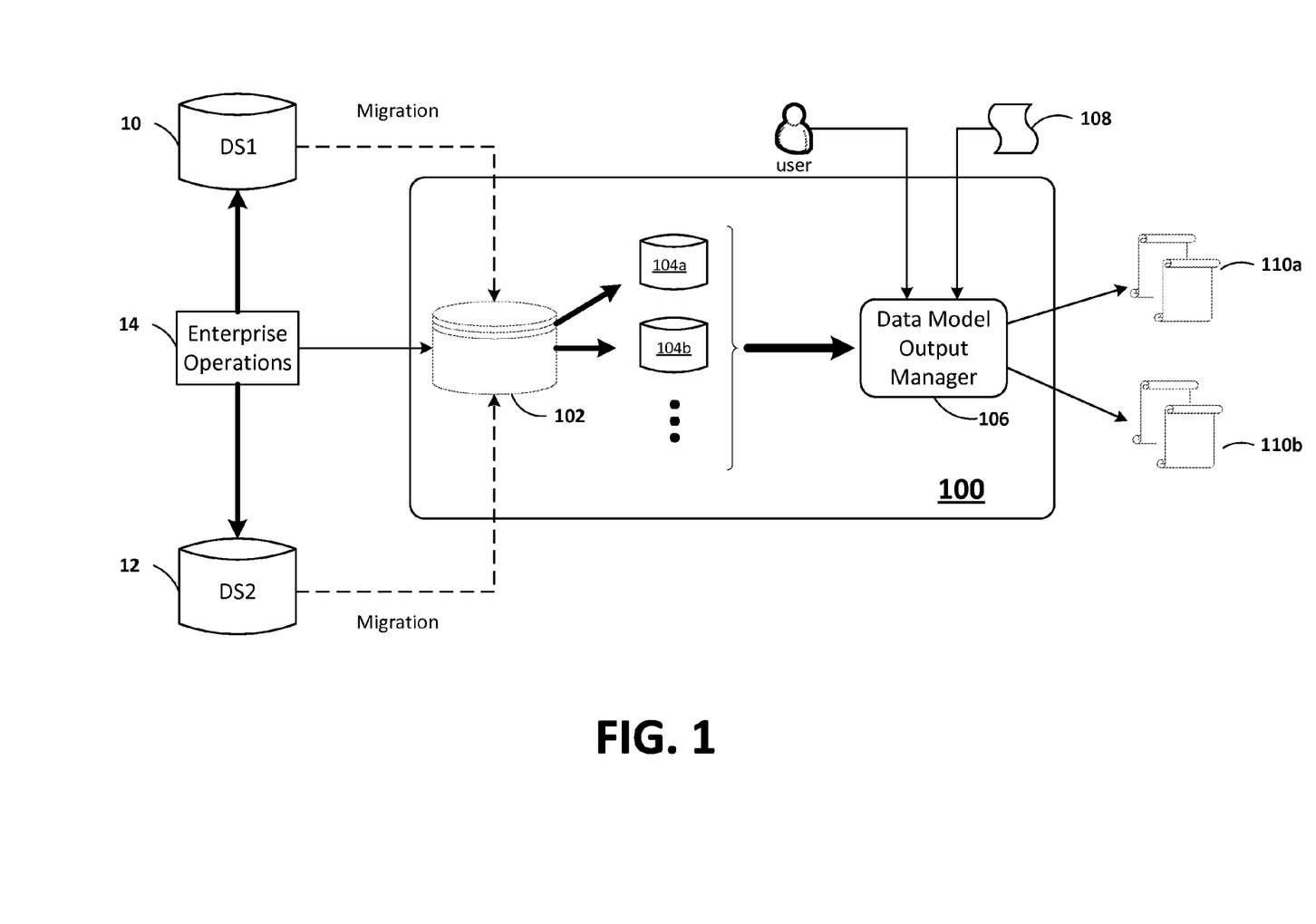
FIG. 1 illustrates a database system in accordance with one or more example embodiments.

FIG. 1 illustrates a database system in accordance with one or more example embodiments. As shown in FIG. 1 a database system 100 in accordance with embodiments of the present disclosure. The database system 100 may include a database 102. One or more database schema instances ("database schemas") 104*a*, 104*b* may be defined in the database system 100. A data model output manager 106 may be provided to allow a user to query the received data model 108 to generate reports, result tables, and other output 110*a*, 110*b*.

The figure illustrates a configuration where the database system 100 is installed in an enterprise (customer) to enhance or eventually replace the data systems of the enterprise. For example, the enterprise may have pre-existing (legacy) currently operating data systems 10 and 12. Typical data systems in an enterprise, for example, include enterprise resource planning (ERP), customer relationship management (CRM), human capital management (HCM), and so on. Portions of the data systems 10, 12 may be migrated over, or in some situations replicated, to the database system 100. As data continues to be generated from the various operations 14 in the enterprise (e.g., sales, manufacturing, etc.), the data may continue to feed into the pre-existing data systems 10, 12. For the data that has been migrated (or replicated), data from the enterprise operations 14 may feed into the database system 100. For example, the data may be stored in database schemas 104*a*, 104*b* which may represent portions of respective data systems 10, 12 that have been migrated to the database system 100.

In some embodiments, a provider may provide data modeling services to support users of the database system 100. For example, the provider may provide data models 108 to model the data contained in database schemas 104*a*, 104*b*. In some embodiments, the data model output manager 106 may receive a data model 108 and, using the received data model, query the data model to extract data (e.g., result tables 110*a*)

from the database schema (e.g., 104*a*). In a particular embodiment, for example, the database system 100 may be a SAP HANA® database product developed and sold by SAP, Inc. SAP support teams may provide data models call HANA Content Packages to the customer to model the data in database schemas defined in the database system 100.

As is conventionally understood, a "database schema" is a specification that defines an organization of data. For example, the data may be organized into a set of data tables (e.g., "Customer Information", "Product Information", etc.) that are called out in the specification. Each data table may have table fields (e.g., "customer ID", "customer address", "product ID", etc.), field attributes, and so on which are stored in the specification. The specification may be stored in a file called a data dictionary.

A user may create an "instance" of a database schema. For example, when a database schema has been instantiated, the database system 100 may create instances of the data tables (e.g., "Customer Information", "Product Information", etc.) defined in the database schema; e.g., by creating a set of data files in the database system. The data table instances may then be populated with actual data (e.g., from the enterprise's data systems or operations such as sales, manufacturing, etc.) in accordance with the organizational scheme defined by the database schema.

In most contexts, the term "database schema" may be understood to refer to an "instance" of the database schema, because in most cases one speaks of specific instances of a database schema rather than the data organization itself. For example, 104*a*, 104*b* in FIG. 1 represent instances of a database schema. Accordingly, the phrase "database schema" will be understood as referring to instances of the database schema rather than referring to the organization of the data. If "database schema" is intended to refer to the organization of the data itself, that intention will be made explicit.

Multiple instances of the same database schema may be created in a database system. An example of how this can happen may be provided by the configuration shown in FIG. 1. Suppose, for example, the enterprise uses an ERP system to manage the flow of information among its various business operations, and that the enterprise has deployed a copy of the ERP system in the U.S. as data system 10 and another copy in Europe as data system 12. Suppose further that the enterprise has migrated its sales data from each ERP data system 10, 12 to the database system 100. The enterprise may want to keep the U.S. sales data separated from the European sales data. To do this, a user may define a database schema in the database system 100 which duplicates the data organization that is used to store sales data in the ERP data systems 10 and 12. The user may then create a first instance 104*a* of the database schema for U.S. sales by migrating the sales data from ERP data system 10 into the first instance. The user may also create a second instance 104*b* of the database schema for European sales by migrating the sales data from ERP data system 12 into the second instance. Database schemas 104*a*, 104*b* represent multiple instances of the same database schema.

Continuing with FIG. 1, in accordance with principles of the present invention, the data model output manager 106 may generate separate data views for each of the multiple instances 104*a*, 140*b* of the database schema using the same data model. For example, the data model output manager 106 may use data model 108 in a first data view (not shown) to allow a user to generate reports and other output tables 110*a* from data contained in database schema 104*a* using the first data view. The data model output manager 106 may use the same data model 108 in a second data view (not shown) to allow a user to generate other output 110*b* from data contained in database schema 104*b* using the second data view. This aspect of the present disclosure will be discussed in more detail below.

Figure 2A:
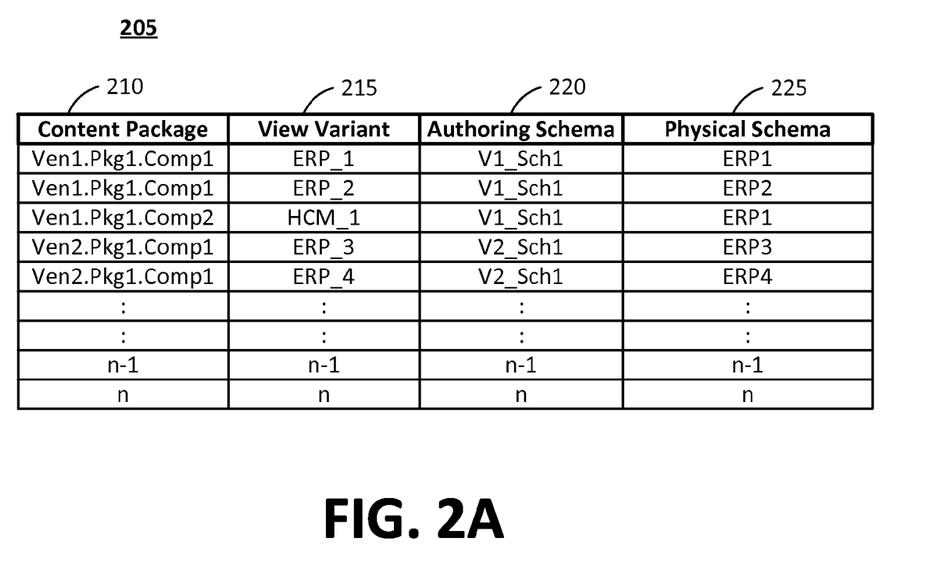
FIGS. 2A and 2B illustrate mapping tables in accordance with one or more example embodiments.
Figure 2B:
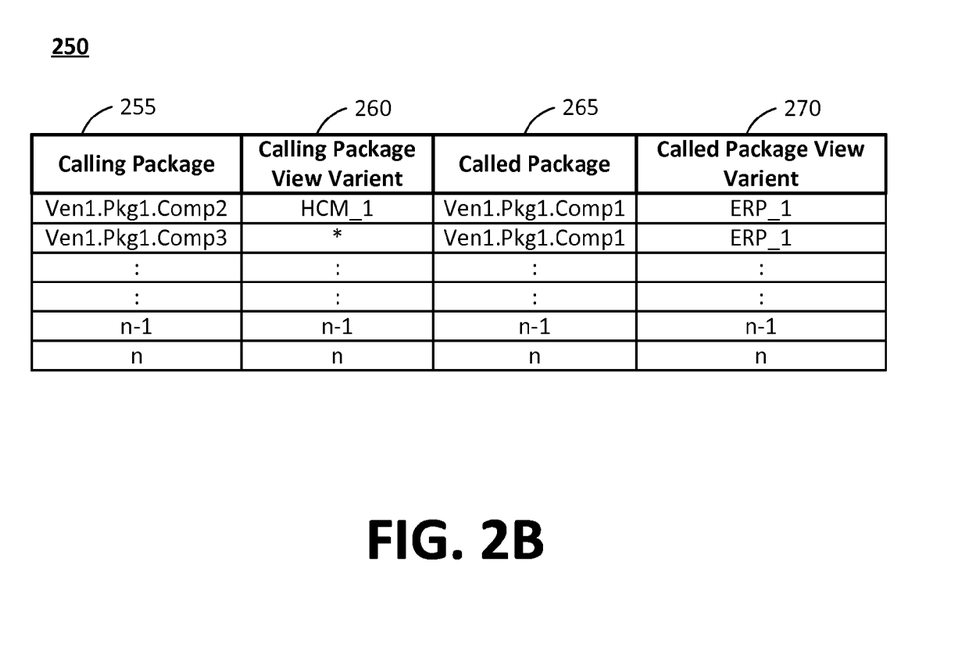

FIGS. 2A and 2B illustrate mapping tables in accordance with one or more example embodiments. As shown in FIG. 2A, mapping table 205 includes four columns. The four columns are content package 210, view variant 215, authoring schema 220, and physical schema 225. Mapping table 205 may be configured to map view variants to different sets of views accessing different schemes. A view variant may be used to uniquely identify content packages. Mapping table 205 allows schema mapping on content package level such that each content package may have a different schema mapping. A content package may or may not have the same schema. A content package may or may not have the same physical schema.

For example, the first two rows of mapping table 205 include view variant, ERP_1 and ERP_2 respectively. Each view variant is associated with a same content package Ven1.Pkg1.Comp1. The content package may be associated with a vendor (e.g., SAP®), a package (e.g., an ERP), and a component (e.g., ERP central component (ECC)). However, each view variant is associated with a different physical (e.g., database) schema, ERP1 and ERP2 respectively. As shown in FIG. 1, this scenario may occur if the enterprise uses an ERP system to manage the flow of information among its various business operations, and that the enterprise has deployed a copy of the ERP system in, for example, the U.S. as data system 10 and another copy in Europe as data system 12.

Utilizing mapping table 205, view variants may be configured by administrators of a system (e.g., customer system) and may be used to get different sets of views accessing different schemes. System administrators may specify how many different variants of the views the system administrator needs and the possibility exists to specify how the schema mapping of each of the specified variants shall be configured. In the scenario above the system administrator may specify to have two view variants and would specify that one view variant is accessing physical schema ERP1 and the other accessing physical schema ERP2.

Schema mapping is considered when database (e.g., HANA™ database) catalog objects are generated based on the modeled objects in the content packages (e.g., HANA™ content packages). When catalog objects are generated an extended schema mapping with variants is taken into account. The extended schema mapping with variants may create one catalog object per view variant created. Each catalog object (per view variant) considering the corresponding schema mapping from an authoring schema to a physical schema.

Further, views (hereinafter called calling views for clarity) based on views for which there are different view variants (e.g., ERP_1 and ERP_2 shown in mapping table 205) (hereinafter called mapped views for clarity) may specify which of the view variants the calling views call. With one view variant there is no confusion as to which mapped view a calling view refers to. However, if more that one mapped view exists for a given content package, a calling view may refer to an incorrect mapped view. Therefore another mapping table 250 is defined.

As shown in FIG. 2B, mapping table 250 includes four columns. The four columns are calling package 255, calling package view variant 260, called package 265, and called package view variant 270. Mapping table 250 may be configured to map a calling view correct mapped view. For example, a HCM component of a content package may include a calling view that calls an ERP component (e.g., mapped view). Mapping table 250 shows view variant HCM_1 mapped to view variant ERP_1.

Utilizing mapping table 250, view variants may be configured by administrators of a system (e.g., customer system) and may be used to map calling views to mapped views. In the scenario above the system administrator may specify to have a calling view refer to the correct mapped view if two or more view variants could have been referred to by the calling view.

One embodiment includes a method for sharing data in an interconnected database system. The method includes receiving a data model configured to model data in a first database schema in a database system, using the received data model to generate a first data view of a first instance of the first database schema in the database system, including referencing, using a first view variant, one or more data tables including the first instance of the first database schema to generate the first data view, and using the received data model to generate a second data view of a second instance of the first database schema in the database system, including referencing, using a second view variant, one or more data tables including the second instance of the first database schema to generate the second data view.

Figure 3:
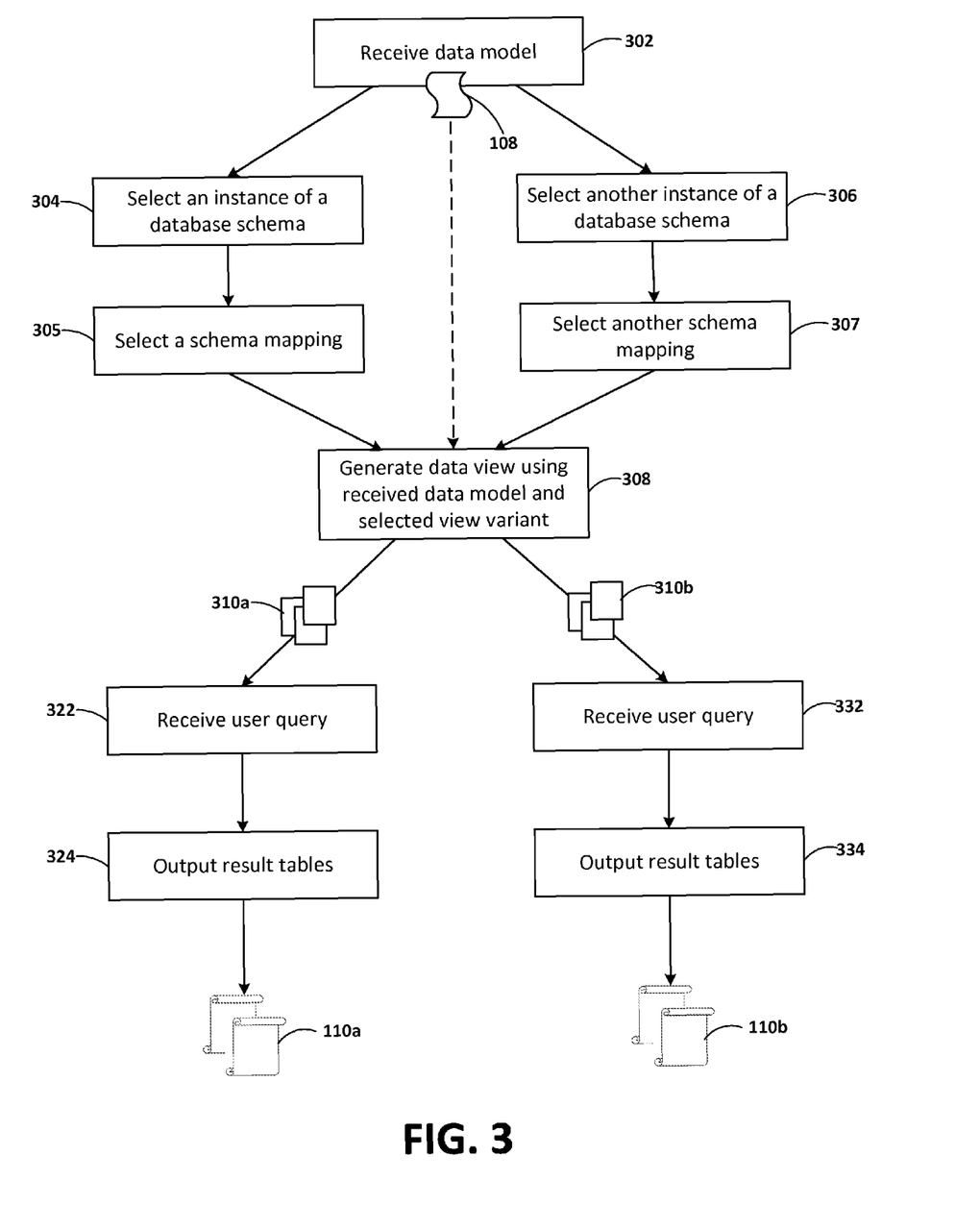
FIG. 3 illustrates a general process flow for generating data views in accordance with one or more example embodiments.

FIG. 3 illustrates a general process flow for generating data views in accordance with one or more example embodiments. As shown in FIG. 3, a general workflow in database system 100 according to example embodiments is shown. The workflow may begin in a process block 302, where the database system 100 receives a data model 108 into the database system 100. In some embodiments, the data model 108 may specify database operations (e.g., JOIN, SELECT, AVERAGE, etc.) to be performed on data tables and table fields including a given database schema. The data model 108, for example, may be provided from a development group within an enterprise, from a third party provider, and so on.

In accordance with example embodiments, the data model 108 may be used to model each instance of the database schema from among multiple instances. For example, in a process block 304, a user may select an instance (e.g., 104*a*) of the database schema to be modeled; for example, by specifying the name of the instance. In some embodiments, a user interface may display a list of database schema instances to choose from.

Upon selection of instance of the database schema from among multiple instances, the instance may be mapped to database schema using a view variant. For example, in a process block 304, the data model output manager 106 may refer to (e.g., utilizing a look-up or query) mapping table 205 to determine the view variant for the database schema. For example, if the user selected an instance of the database schema associated with content package Ven1.Pkg1.Comp1 and physical schema ERP1, the data model output manager 106 may determine the view variant as ERP_1. A resultant schema mapping for a data table named table1 may be "ERP_1/Ven1.Pkg1.Comp1/table1".

In a process block 308, the data model output manager 106 may generate a data view 310*a* using the data model 108 received in process block 302. The data view 310*a* may then be queried by the user. For example, in step 322, one or more queries (e.g., SELECT) may be received from the user and in step 324 results 110*a* from the query may be output to the user; e.g., on a display, printed out, and so on. A data view contains the information which specifies a "view" (e.g., tables, graphs, reports, etc.) of stored data. A data view specifies which tables to access, which fields of these tables, etc. The data view may be accessed via an SQL select statement to return data, for example, in a data table referred to as a "result table". The result table may be presented to the user, for example, on a display. A data view is typically persisted (e.g., stored in a data store), while result tables are typically transient (e.g., displayed on a monitor), but may be printed (e.g., reports).

Another user may want to model another instance of the database schema using the same data model 108. Accordingly, in a process block 306, the other user may select another database schema (e.g., 104*b*) to be modeled. Upon selection of another instance of the database schema, the instance may be mapped to the database schema using another view variant. For example, in a process block 305, the data model output manager 106 may refer to (e.g., utilizing a look-up or query) mapping table 205 to determine the view variant for the database schema. For example, if the user selected an instance of the database schema associated with content package Ven1.Pkg1.Comp1 and physical schema ERP2, the data model output manager 106 may determine the view variant as ERP_2. A resultant schema mapping for a data table named table1 may be "ERP_2/Ven1.Pkg1.Comp1/table1".

Process block 308 may be invoked to cause the data model output manager 106 to generate a second data view 310*b* using the data model 108 received in process block 302. The user may then query the second data view 310*b* (in a step 332) to produce various output 110*b* (in a step 334).

Figure 4:
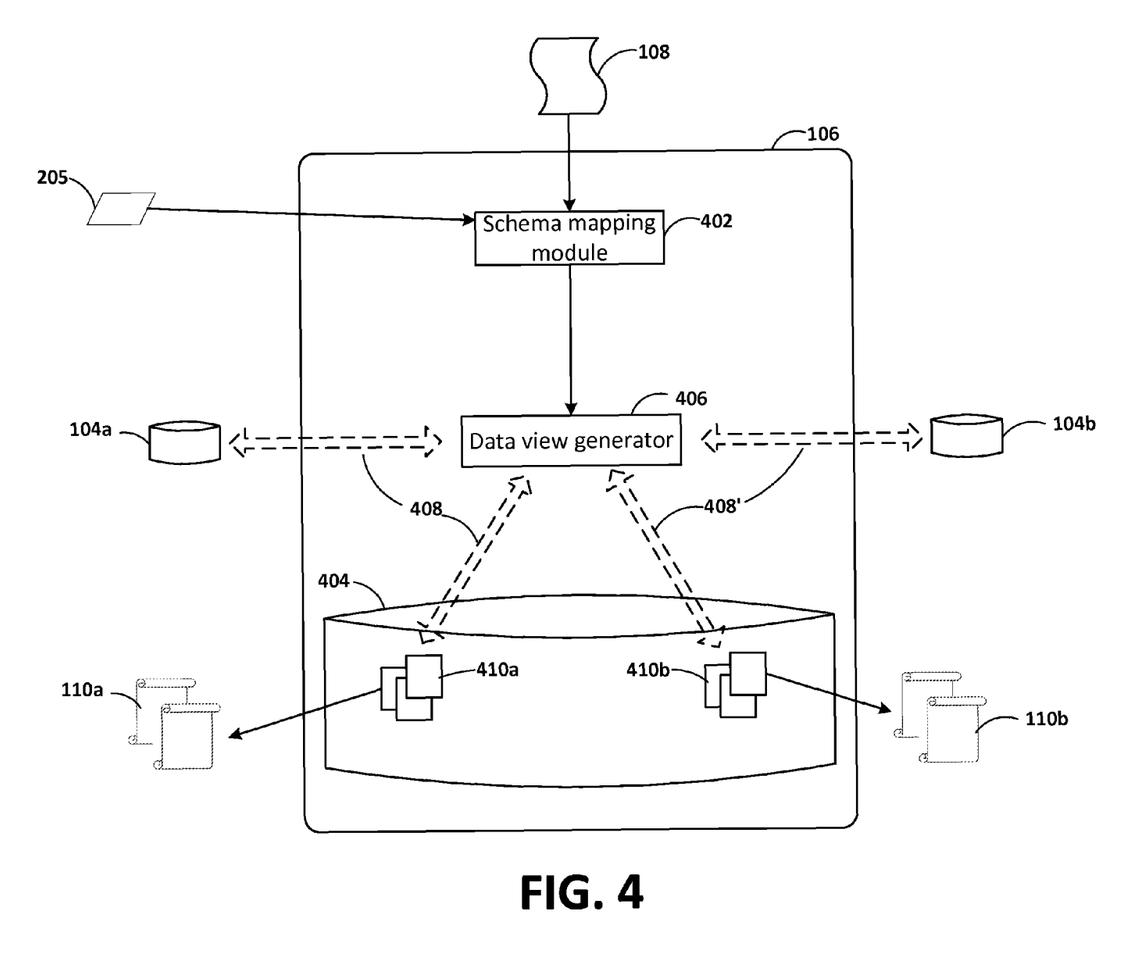
FIG. 4 illustrates a data model output manager for generating data views against multiple instances of a database schema using the same data model in accordance with one or more example embodiments.

FIG. 4 illustrates a data model output manager for generating data views against multiple instances of a database schema using the same data model in accordance with one or more example embodiments. As shown in FIG. 4, in some embodiments, the data model output manager 106 may include a schema mapping module 402, a data view generator 406, and a database schema 404. The data model 108 may designate a specific instance of a database schema (e.g., 104*a*) in the database system 100. When the data model output manager 106 receives the data model 108, the schema mapping module 402 may map the received data model as data model 408 and associate the received data model with the designated database schema 104*a*.

In accordance with example embodiments, the schema mapping module 402 may map another data model 408' of the received data model 108 and associate data model 408' with another instance of the database schema (e.g., 104*b*). For example, as described above with reference to FIGS. 2A and 3, an instance of the database schema associated with content package Ven1.Pkg1.Comp1 and physical schema ERP1, the data model output manager 106 may determine the view variant as ERP_1 and an instance of the database schema associated with content package Ven1.Pkg1.Comp1 and physical schema ERP2, the data model output manager 106 may determine the view variant as ERP_2.

For example, the mapped data model 408 may refer to data tables in database schema 104*a* as the source of data for the data model differently than the data tables in database schema 104*b*. Accordingly, mapped data model 408' may be mapped such that that the corresponding data tables in database schema 104*b* are referred to differently than the corresponding data tables in database schema 104*a*. For example, the names of the data tables in database schema 104*a* are the same as the names of the data tables in database schema 104*b*. However, the full technical name of a data table in a given database schema includes the name of the database schema to which the data table belongs; e.g., SCHEMA1.TABLE1 may be the full technical name of TABLE1 in database schema SCHEMA1. Accessing a data table requires the full technical name. Therefore according to example embodiments, the full technical name may be modified according to the mapping (e.g., based on the mapping in table 205); hence:

Select From ERP_1.SCHEMA1.TABLE1 . . .
or
Select From ERP_2.SCHEMA1.TABLE1 . . .

The data view generator 406 may receive a reference to the mapped data model 408 and generate a data view 410a which references data tables in the associated database schema 104a. Likewise, the data view generator 406 may receive a reference to the mapped data model 408' and generate a data view 410b which references data tables in the associated database schema 104b.

In some embodiments, the data views 410a, 410b may be persisted in a database schema. Referring to FIG. 4, for example, a database schema 404 may store data view 410a. A user may execute the data view 410a to produce result tables 110a from data referenced in database schema 104a. Likewise, the database schema 404 may store data view 410b, and a user may execute data view 410b to produce output 110b from data referenced in database schema 104b.

Since the data model 408 uses data from database schema 104a and data model copy 408' uses data from database schema 104b, the data contained in respective result tables 110a, 110b generated by executing respective the data views 410a, 410b are likely to be different. However, because the data model 408' is and the data model 408 share the same authoring schema, the names of the data views 410a and 410b will be identical. For example, if the data model 408 specifies a data view called ViewOnTotalSales, then the data view 410a will use the name ViewOnTotalSales and data view 410b would also use the name ViewOnTotalSales, thus creating a naming conflict.

According to example embodiments, the method described above may further include receiving a schema defining a third data view, and modifying the third data view based on one of the generated first data view and the generated second data view. Modifying the third data view may include determining a dependence between the third data view and one of the generated first data view and the generated second data view based on a look-up in a data table, and changing the schema defining the third data view to reference one of the generated first data view and the generated second data view based on the determined dependence.

Figure 5:
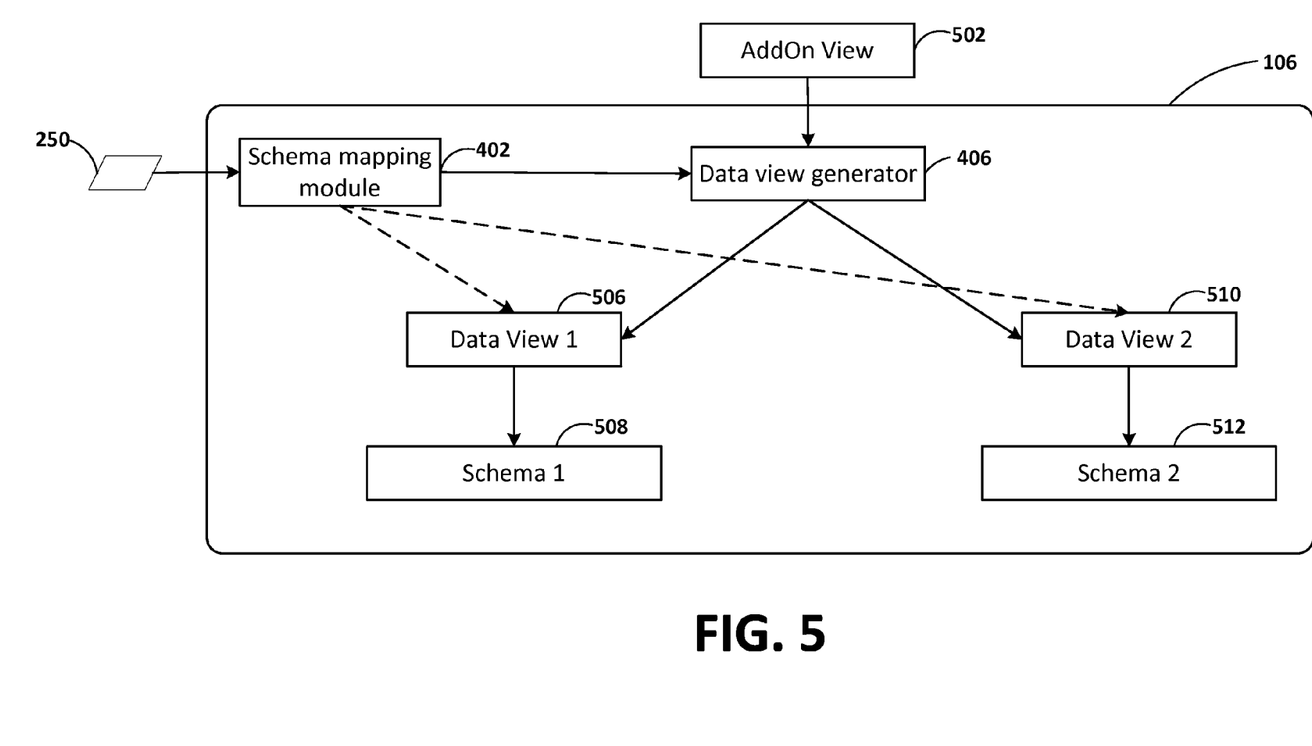
FIG. 5 illustrates mapping an add-on view in accordance with one or more example embodiments.

FIG. 5 illustrates mapping an add-on view in accordance with one or more example embodiments. As shown in FIG. 5, mapping an add-on view may include an add-on view block, the data model output manager 106 (including the schema mapping module 402 and the data view generator 406), a data view 506, a data view 510, a schema 1 and a schema 2. As discussed above, calling views may be based on mapped views; FIG. 5 illustrates add-on view 502 as a calling view and one of data view 506 and data view 510 being a mapped view. The schema mapping module 402 may utilize table 250 to map add-on view 502 to one of data view 506 and data view 510. For example, if table 250 indicates add-on view 502 as referencing data view 506, schema 508 may be the resultant schema. On the other hand, if table 250 indicates add-on view 502 as referencing data view 510, schema 512 may be the resultant schema.

Continuing the two examples above, the full technical name of a data view in a given database schema includes the name of the database schema to which the data view belongs; e.g., SCHEMA1.VIEW1 (or ViewOnTotalSales) may be the full technical name of VIEW1 (or ViewOnTotalSales) in database schema SCHEMA1. Accessing a data view requires the full technical name. Therefore, according to example embodiments, the full technical name may be modified according to the mapping (e.g., based on the mapping in table 250); hence:

Select From ERP_1.SCHEMA1.VIEW1 . . .
or
Select From ERP_2.SCHEMA1.VIEW1 . . .
and,
Select From ERP_1.SCHEMA1.ViewOnTotalSales . . .
or
Select From ERP_2.SCHEMA1.ViewOnTotalSales . . .

Accordingly, if no view variants are introduced the schema mapping module 402 will not acquire and append a prefix to the technical name of the add-on view. However, for each dependency, specifying (e.g., utilizing table 250) which of the view variants are relevant for each calling package may link the corresponding mapped view to the calling view.

Figure 6:
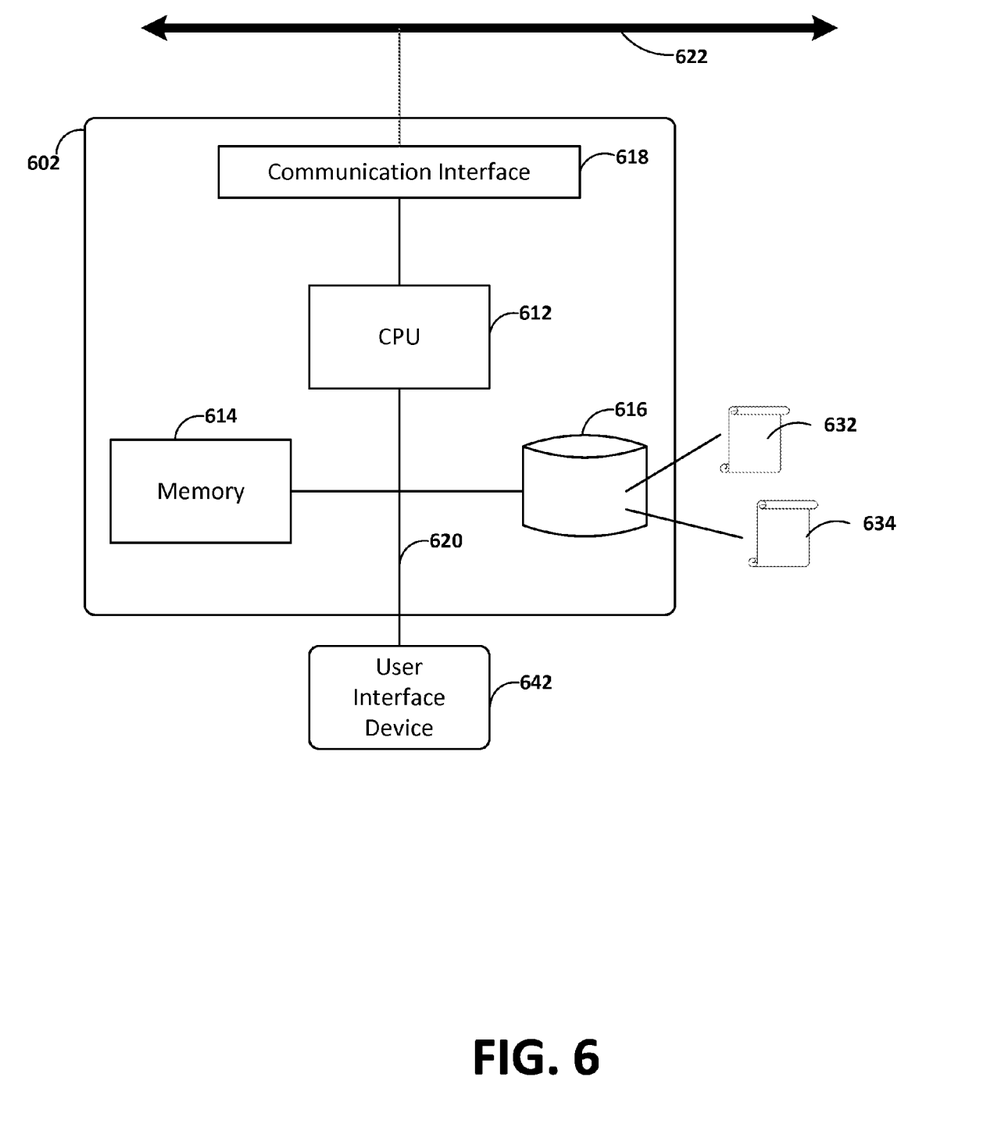
FIG. 6 illustrates a high level system diagram of a database system in accordance with one or more example embodiments.

FIG. 6 illustrates a high level system diagram of a database system in accordance with one or more example embodiments. The database system may be, for example, database system 100 described above. As shown in FIG. 6, the database system may include a high level block diagram of a computer system 602 configured to operate in accordance with the present disclosure. The computer system 602 may include a central processing unit (CPU) 612 or other similar data processing component, including multiprocessor configurations.

The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), the Internet, and so on. An internal bus 620 may interconnect the components including the computer system 602.

The data storage device 616 may include a non-transitory computer readable medium having stored thereon computer executable program code 632. The computer executable program code 632 may be executed by the CPU 612 to cause the CPU to perform steps of the present disclosure, for example the steps set forth in FIG. 3, or processing described in embodiments of the data model output manager 106 shown in FIGS. 4 and 5. The data storage device 616 may store data structures 634 such as object instance data, runtime objects, and any other data described herein (e.g., mapping tables 205 and 250). In some embodiments, for example, the data storage device 616 may be a storage subsystem to provide the database 102 and to store database schemas 104a, 104b.

A user may interact with the computer system 602 using suitable user interface devices 642. They may include, for example, input devices such as a keyboard, a keypad, a mouse or other pointing device, and output devices such as a display.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
receiving a data model configured to model data in a first database schema in a database system;
using the received data model to generate a first data view of a first instance of the first database schema in the database system, including referencing, using a first view variant, one or more data tables including the first instance of the first database schema to generate the first data view; and using the received data model to generate a second data view of a second instance of the first database schema in the database system, including referencing, using a second view variant, one or more data tables including the second instance of the first database schema to generate the second data view.

2. The method of claim 1, wherein the first data view and the second data view are separate data views stored in an instance of a shared database schema.

3. The method of claim 2, wherein first result tables are generated from the first data view by accessing data stored in the one or more data tables in the first instance of the first database schema, and second result tables are generated from the second data view by accessing data stored in the one or more data tables in the second instance of the first database schema.

4. The method of claim 1, wherein the first view variant is stored in a data table in reference to the data model and the first instance of the first database schema, and generating the first data view includes looking-up the first view variant in the data table.

5. The method of claim 1, wherein the second view variant is stored in a data table in reference to the data model and the second instance of the first database schema, and generating the second data view includes looking-up the second view variant in the data table.

6. The method of claim 1, further comprising:

receiving a schema defining a third data view; and modifying the third data view based on one of the generated first data view and the generated second data view.

7. The method of claim 6, wherein modifying the third data view includes, determining a dependence between the third data view and one of the generated first data view and the generated second data view based on a look-up in a data table; and changing the schema defining the third data view to reference one of the generated first data view and the generated second data view based on the determined dependence.

8. The method of claim 7, wherein the look-up in the data table returns one of the first view variant and the second view variant.

9. A database system comprising:

a computer system; and a data storage device having stored thereon executable program code which, when executed by the computer system, causes the computer system to:

receive a data model which models data in a first database schema in the database system;

use the received data model to generate a first data view of a first instance of the first database schema in the database system, including referencing, using a first view variant, one or more data tables including the first instance of the first database schema to generate the first data view; and use the received data model to generate a second data view of a second instance of the first database schema in the database system, including referencing, using a second view variant, one or more data tables including the second instance of the first database schema to generate the second data view.

10. The database system of claim 9, wherein the first data view and the second data view are separate data views stored in an instance of a shared database schema.

11. The database system of claim 10, wherein first result tables are generated from the first data view by accessing data stored in the one or more data tables in the first instance of the first database schema, and second result tables are generated from the second data view by accessing data stored in the one or more data tables in the second instance of the first database schema.

12. The database system of claim 9, wherein the first view variant is stored in a data table in reference to the data model and the first instance of the first database schema, generating the first data view includes looking-up the first view variant in the data table, the second view variant is stored in the data table in reference to the data model and the second instance of the first database schema, and generating the second data view includes looking-up the second view variant in the data table.

13. The database system of claim 9, wherein the executable program code which, when executed by the computer system, further causes the computer system to:

receive a schema defining a third data view; and modify the third data view based on one of the generated first data view and the generated second data view.

14. The database system of claim 13, wherein modifying the third data view includes, determining a dependence between the third data view and one of the generated first data view and the generated second data view based on a look-up in a data table; and changing the schema defining the third data view to reference one of the generated first data view and the generated second data view based on the determined dependence.

15. A non-transitory computer-readable storage medium having stored thereon computer executable program code which, when executed on a computer system, causes the computer system to perform steps of:

receiving a data model which models data in a first database schema in the database system;

using the received data model to generate a first data view of a first instance of the first database schema in the database system, including referencing, using a first view variant, one or more data tables including the first instance of the first database schema to generate the first data view; and using the received data model to generate a second data view of a second instance of the first database schema in the database system, including referencing, using a second view variant, one or more data tables including the second instance of the first database schema to generate the second data view.

16. The non-transitory computer-readable storage medium of claim 15, wherein the first data view and the second data view are separate data views stored in an instance of a shared database schema.

17. The non-transitory computer-readable storage medium of claim 16, wherein first result tables are generated from the first data view by accessing data stored in the one or more data tables in the first instance of the first database schema, and second result tables are generated from the second data view by accessing data stored in the one or more data tables in the second instance of the first database schema.

18. The non-transitory computer-readable storage medium of claim 15, wherein the first view variant is stored in a data table in reference to the data model and the first instance of the first database schema, generating the first data view includes looking-up the first view variant in the data table, the second view variant is stored in the data table in reference to the data model and the second instance of the first database schema, and generating the second data view includes looking-up the second view variant in the data table.

19. The non-transitory computer-readable storage medium of claim 15, wherein the executable program code which, when executed by the computer system, further causes the computer system to:

receive a schema defining a third data view; and modify the third data view based on one of the generated first data view and the generated second data view.

20. The non-transitory computer-readable storage medium of claim 19, wherein modifying the third data view includes, determining a dependence between the third data view and one of the generated first data view and the generated second data view based on a look-up in a data table; and changing the schema defining the third data view to reference one of the generated first data view and the generated second data view based on the determined dependence.

\* \* \* \* \*